(12) United States Patent
Reed et al.

(10) Patent No.: US 7,174,553 B1
(45) Date of Patent: Feb. 6, 2007

(54) INCREASING PARALLELISM OF FUNCTION EVALUATION IN A DATABASE

(75) Inventors: Michael L. Reed, San Diego, CA (US); John D. Frazier, Ramona, CA (US); Kevin D. Virgil, Oceanside, CA (US)

(73) Assignee: NCR Corp., Dayton, OH (US)

( * ) Notice: Subject to any disclaimer, the term of this patent is extended or adjusted under 35 U.S.C. 154(b) by 732 days.

(21) Appl. No.: 10/302,358

(22) Filed: Nov. 22, 2002

(51) Int. Cl.
*G06F 9/46* (2006.01)
*G06F 7/00* (2006.01)
*G06F 12/00* (2006.01)

(52) U.S. Cl. .................. 718/102; 718/100; 718/107; 707/1; 707/2; 707/3; 707/100; 707/102; 707/200

(58) Field of Classification Search ........ 707/100–102, 707/103 R, 103 Y, 104.1, 1–3, 200; 718/100–108
See application file for complete search history.

(56) References Cited

U.S. PATENT DOCUMENTS

| | | | |
|---|---|---|---|
| 6,711,560 B2* | 3/2004 | Levy et al. ................. 707/1 |
| 6,721,725 B2* | 4/2004 | Levy et al. ................. 707/2 |
| 2002/0161784 A1* | 10/2002 | Tarenskeen ................. 707/200 |
| 2003/0216901 A1* | 11/2003 | Schaumont et al. ........ 703/13 |
| 2004/0148273 A1* | 7/2004 | Allen et al. ................. 707/2 |
| 2005/0091238 A1* | 4/2005 | Zane et al. ................. 707/100 |
| 2005/0131880 A1* | 6/2005 | Yoaz et al. ................. 707/3 |
| 2005/0182782 A1* | 8/2005 | Anderson ................. 707/102 |

OTHER PUBLICATIONS

Lanzelotte et al., "On the Effectiveness of Optimization Search Strategies for Parallel Execution Spaces", 19th VLDB Conference, Ireland, 1993, pp. 493-504.*
Dalvi et al., "Pipelining in Multi-Query Optimization", ACM, 2001, pp. 59-70.*
Hasan et al., "Open Issues in Parallel Query Optimization", SIGMOD Record, vol. 25, No. 3, 1996, pp. 28-33.*

* cited by examiner

*Primary Examiner*—Meng-Ai T. An
*Assistant Examiner*—Jennifer N. To
(74) *Attorney, Agent, or Firm*—Frommer, Lawrence Houg, LLP

(57) ABSTRACT

Methods and apparatus for parallel execution in a database system. In one implementation, a database system includes: one or more data storage facilities for use in storing data composing records in tables of a database; one or more processing modules configured to manage the data stored in the data-storage facilities, where at least one processing module is configured to: open a memory pipe for a pipe operator, run a first thread to execute a pipe source operation providing output data to the memory pipe, and run a second thread to execute a pipe sink operation receiving input data from the memory pipe while the first thread is running; and a database management component configured to parse an expression and recognize a pipe operator and a pipe source operation and a pipe sink operation for the pipe operator.

20 Claims, 5 Drawing Sheets

600

| OPERATION (605) | SOURCE (610) |
|---|---|
| locvarudt | table1.document |
| appendvarudt | |
| pipe | |
| udm call for grep | PIPE 1 |
| pipe | |
| udm call for wc | PIPE 2 |
| udtneqop | |

INCREASING PARALLELISM OF FUNCTION EVALUATION IN A DATABASE

BACKGROUND

In a typical database system supporting SQL (Structured Query Language), table entries or rows can include one or more fields that are user defined type (UDT) fields. One type of UDT is a UDT structured type. The UDT structured type shares many properties in common with the C-language "struct." Both a C-language struct and a UDT structured type can be declared to be composed of any number of data members which can be either homogeneous or heterogeneous with respect to their data types. Both a C-language struct and a UDT structured type can also be nested, containing data members which are themselves structured types. The declaration of a UDT structured type is entered into the DBS system using SQL Data Definition Directives.

Typically, a UDT has one or more user defined methods (UDM). In addition, some databases provide user defined functions (UDF) independent of UDT's or allows users to define LDF's directly. Often UDF's or UDM's are used in expressions and the database system executes the UDF's and UDM's in an expression in a serial fashion. For complex and large data types and complex UDF's and UDM's, serial execution may be slow.

SUMMARY

The present disclosure provides methods and apparatus for parallel execution in a database system. In one implementation, a database system includes: one or more data storage facilities for use in storing data composing records in tables of a database; one or more processing modules configured to manage the data stored in the data-storage facilities, where at least one processing module is configured to: open a memory pipe for a pipe operator, run a first thread to execute a pipe source operation providing output data to the memory pipe, and run a second thread to execute a pipe sink operation receiving input data from the memory pipe while the first thread is running; and a database management component configured to parse an expression and recognize the pipe operator and the pipe source operation for the pipe operator and the pipe sink operation for the pipe operator.

In another implementation, a method of parallel execution in a database system includes: receiving an expression including a pipe operator in a database system, where the pipe operator has a pipe source operation and a pipe sink operation; opening a memory pipe in a memory of a processing module in the database system; running a first thread to execute the pipe source operation in the processing module, where the first thread provides output data to the memory pipe; running a second thread to execute the pipe sink operation in the processing module while the first thread is running, where the pipe sink operation receives input data from the memory pipe; and closing the memory pipe.

BRIEF DESCRIPTION OF THE DRAWINGS

FIG. 6 is a representation of an evaluation program as an evaluation program table.

DETAILED DESCRIPTION

Figure 1:
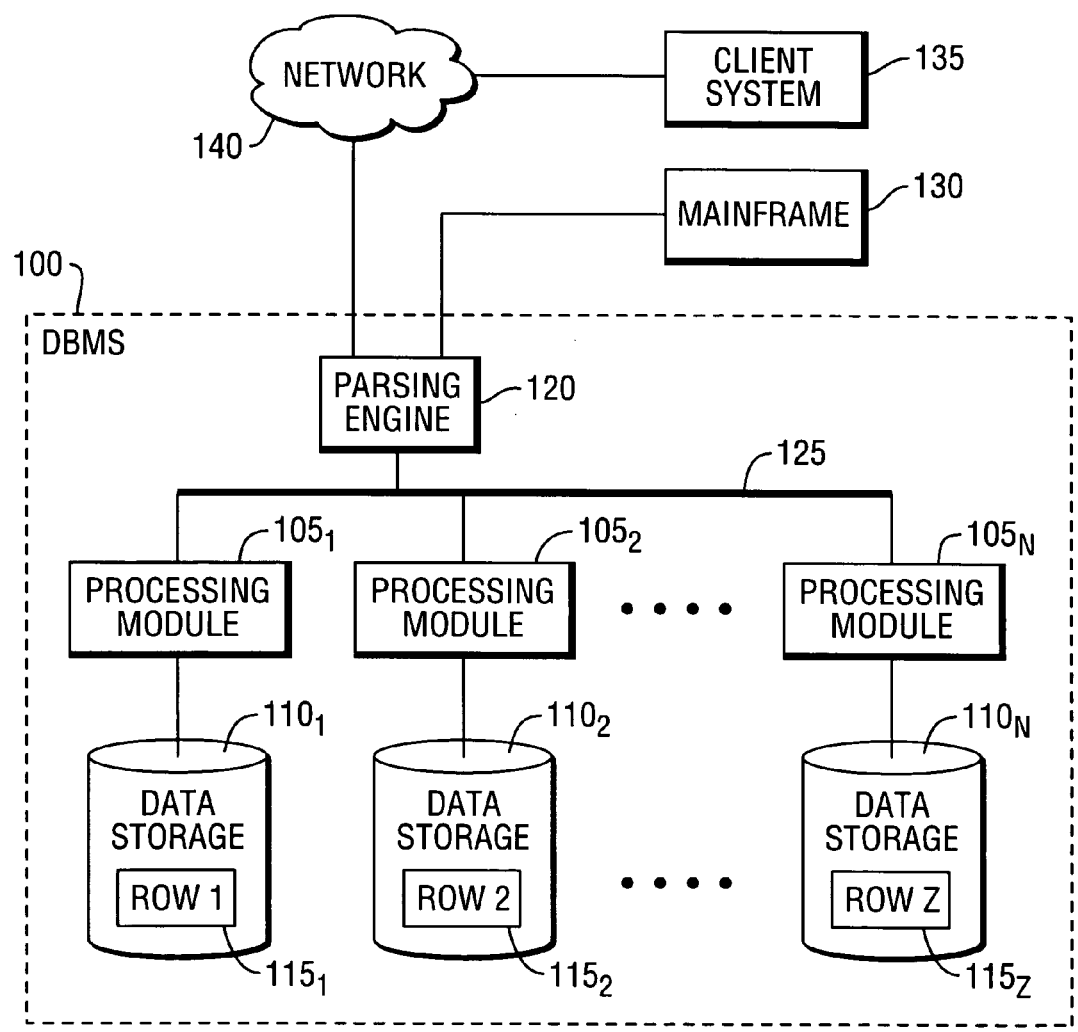
FIG. 1 shows a sample architecture of a database management system (DBMS).

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_{1 \ldots N}$ that manage the storage and retrieval of data in corresponding data-storage facilities $110_{1 \ldots N}$. Each of processing modules $105_{1 \ldots N}$ manages a portion of a database that is stored in a corresponding one of data storage facilities $110_{1 \ldots N}$. Each of data storage facilities $110_{1 \ldots N}$ includes one or more storage devices, such as disk drives.

As described below, DBMS 100 stores and retrieves data for records or rows in tables of the database stored in data storage facilities $110_{1 \ldots N}$. Rows $115_{1 \ldots Z}$ of tables are stored across multiple data storage facilities $110_{1 \ldots N}$ to ensure that system workload is distributed evenly across processing modules $105_{1 \ldots N}$. A parsing engine 120 organizes the storage of data and the distribution of rows $115_{1 \ldots Z}$ among processing modules $105_{1 \ldots N}$ and data storage facilities $110_{1 \ldots N}$. In one implementation, parsing engine 120 forms a database management component for DBMS 100. Parsing engine 120 and processing modules $105_{1 \ldots N}$ are each connected to a database bus 125. Parsing engine 120 and processing modules $105_{1 \ldots N}$ use database bus 125 to send and receive data and messages throughout DBMS 100.

Parsing engine 120 also coordinates the accessing and retrieval of data with processing modules $105_{1 \ldots N}$ from data storage facilities $110_{1 \ldots N}$ in response to queries received from a user at a connected mainframe 130 or from a client computer 135 across a network 140. DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation.

SQL provides various defined types of data and methods for accessing and manipulating data. SQL also supports user defined types (UDT) and user defined methods (UDM). In one implementation, DBMS 100 supports SQL and includes support for UDT's and UDM's.

DBMS 100 provides various operators and keywords for manipulating data, such as the operators and keywords defined for SQL. DBMS 100 provides an operator for increasing parallelism in executing functions. In one implementation, DBMS 100 provides a pipe operator for creating a piped sequence of commands (or "pipeline") in an expression. The operation to the left of the pipe operator is the source operation for the pipe and the operation to the right of the pipe operator is the sink operation for the pipe. The source operation outputs data to the pipe and the sink operation reads data as input from the pipe. For example, the pipe operator allows the following expression to be parsed and executed:

sel * from table1 where (table1.document |
cmd.grep("bad guy stuff") | cmd.wc("−1")< > "0");

The pipeline "table1.document | cmd.grep("bad guy stuff") | cmd.wc("−1")" has two pipes. "table1.document" is the source operation for the first pipe. "cmd.grep("bad guy stuff")" is the sink operation for the first pipe and the source operation for the second pipe. "cmd.wc("−1")" is the sink operation for the second pipe. Accordingly, the output data of "table1.document" is the input data for "cmd.grep("bad guy stuff")" and the output data of "cmd.grep("bad guy stuff")" is the input data of "cmd.wc("−1")". This example expression is discussed further below.

DBMS 100 uses the pipe operator to execute a series of functions or methods from an expression in parallel. Some functions and methods process data progressively. These progressive functions and methods process input data as it is received and so can provide completely processed output data for corresponding input data without waiting to process all of the input data. As a result, output data is available before the progressive function or method has finished processing the input data. By connecting the output of a progressive function or method to the input of a second function or method, the second function or method can begin processing the output data of the progressive function or method in parallel with the processing of the progressive function or method. DBMS 100 uses the pipe operator to provide this connection. Similarly, a series of three or more progressive functions and/or methods can be placed in sequence using multiple pipe operators (e.g., two or more) forming a pipeline to process data in parallel to one another. In one implementation, the pipe operator provides functionality for combining commands (e.g., UDM's and UDF's) similar to a pipe in the UNIX operating system.

Figure 2:
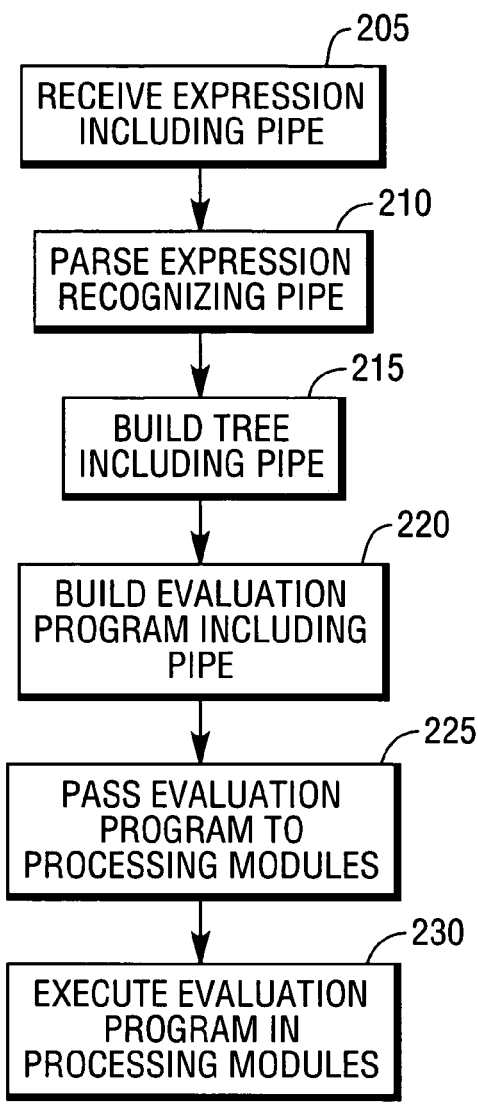
FIG. 2 is a flowchart of parsing and executing an expression including one or more pipe operators in a database system.

FIG. 2 is a flowchart of parsing and executing an expression including one or more pipe operators in a database system. The database system receives an expression including one or more pipe operators, block 205. The pipe operator is an inline operator, such as the "|" symbol. For example, referring to FIG. 1, DBMS 100 receives the example expression shown above from a user at client system 135. In another implementation, a different symbol or command can be used for the pipe operator. The database system can receive the expression as a command line expression or embedded, such as an expression in a script, method, or function. The database system parses the expression, recognizing each pipe operator, block 210. The database system also recognizes the source and sink operations for each pipe operator. For example, referring to FIG. 1, parsing engine 120 parses the example expression, recognizing "|" as the pipe operator. The database system builds an expression tree including a pipe node for each pipe operator, block 215. For example, referring to FIG. 1, parsing engine 120 builds an expression tree from the example expression, such as the expression tree described below referring to FIG. 5. The database system builds an evaluation program including a pipe instruction for each pipe node in the expression tree, block 220. The database system builds the evaluation program by traversing the expression tree, such as using in-order traversal. For example, referring to FIG. 1, parsing engine 120 builds an evaluation program from the expression tree, such as the evaluation program described below referring to FIG. 6. The database system passes the evaluation program to the processing modules that store data for data operated on in the expression, block 225. In one implementation, the database system notes which processing modules are to receive the evaluation program while parsing the expression (e.g., in block 210). For example, referring to FIG. 1, parsing engine 120 sends the evaluation program to each processing module $105_1 \ldots _N$ that stores data in a row $115_1 \ldots _Z$ indicated in the expression. Each of the processing modules receiving the evaluation program executes the evaluation program, including creating a pipe for each pipe instruction in the evaluation program, block 230. A processing module runs a respective thread for the source operation and the sink operation for each pipe operator. For a pipeline including two or more pipes, the source operation for a succeeding pipe is the sink operation for the preceding pipe. Accordingly, a processing module runs three threads for an expression including a pipeline having two pipes. For example, referring to FIG. 1, each processing module $105_1 \ldots _N$ that receives the evaluation program executes the evaluation program creating one or more pipes in the memory of the processing module $105_1 \ldots _N$ and creating multiple threads to execute the operations of the expression. As a result, the database system processes the expression in parallel by using multiple processing modules and of those processing modules processes the expression in parallel using multiple thread indicated by the pipe(s) in the expression.

Figure 3:
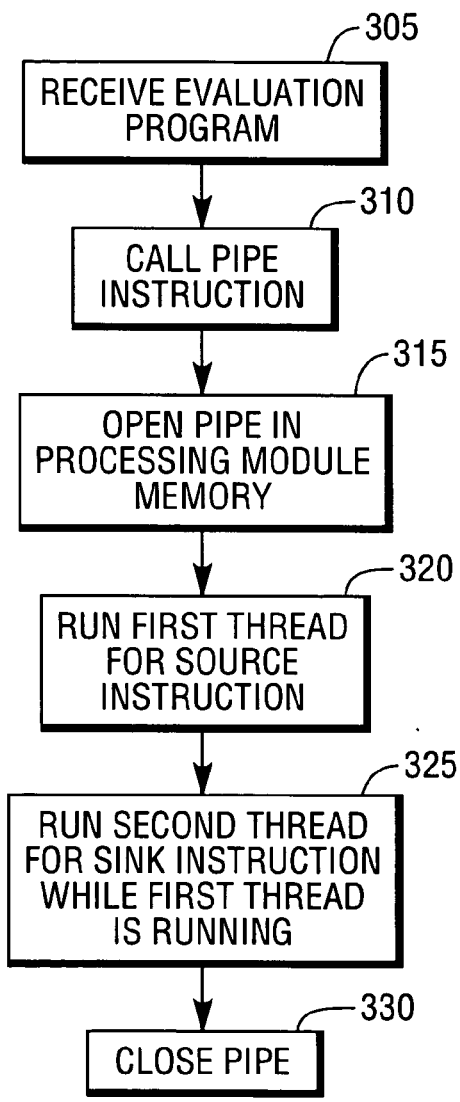
FIG. 3 is a flowchart of executing an evaluation program including one pipe instruction at a processing module.

FIG. 3 is a flowchart of executing an evaluation program including one pipe instruction at a processing module. The processing module receives the evaluation program, block 305. In one implementation, the processing module executes the evaluation program directly or using an interpreter. The processing module recognizes the pipe instruction and the source and sink instructions for the pipe instruction. The processing module calls the pipe instruction, block 310. The processing module opens a memory pipe in the memory of the processing module, block 315. For example, in one implementation, the processing module allocates a section of memory for the pipe (e.g., established for stream access) and associates descriptors with the allocated memory to use for specifying output and input for the source and sink operations, respectively. The processing module calls the source instruction for the source operation and initiates and runs a first thread for the source operation, block 320. The processing module initiates the first thread so that the output data of the first thread is directed to the opened pipe. The processing module calls the sink instruction for the sink operation and initiates and runs a second thread for the sink operation, block 325. The processing module initiates the second thread so that the second thread accesses the opened pipe to receive input data. The processing module runs the second thread while the first thread is still running. Accordingly, the second thread receives data from the memory pipe while the first thread continues to output data to the memory pipe. The processing module does not wait to begin the sink operation until the source operation has completed processing. Therefore, the processing module uses the pipe to execute the two operations (the source and sink operations) in parallel. After both the source and sink operations have completed processing, the processing module closes the pipe, block 330.

In one implementation, a UDT compatible with a pipe includes support methods for using pipes. The support method classtopipe( ) is for writing data to a memory pipe, rather than to storage (e.g., rather than using the support method classtofield( )). The support method pipetoclass( ) is for reading data from a memory pipe, rather than from storage (e.g., rather than using the support method fieldtoclass( )). In this case, the first thread calls classtopipe( ) to direct output data to the memory pipe. The second thread calls pipetoclass( ) to read input data from the memory pipe.

Figure 4:
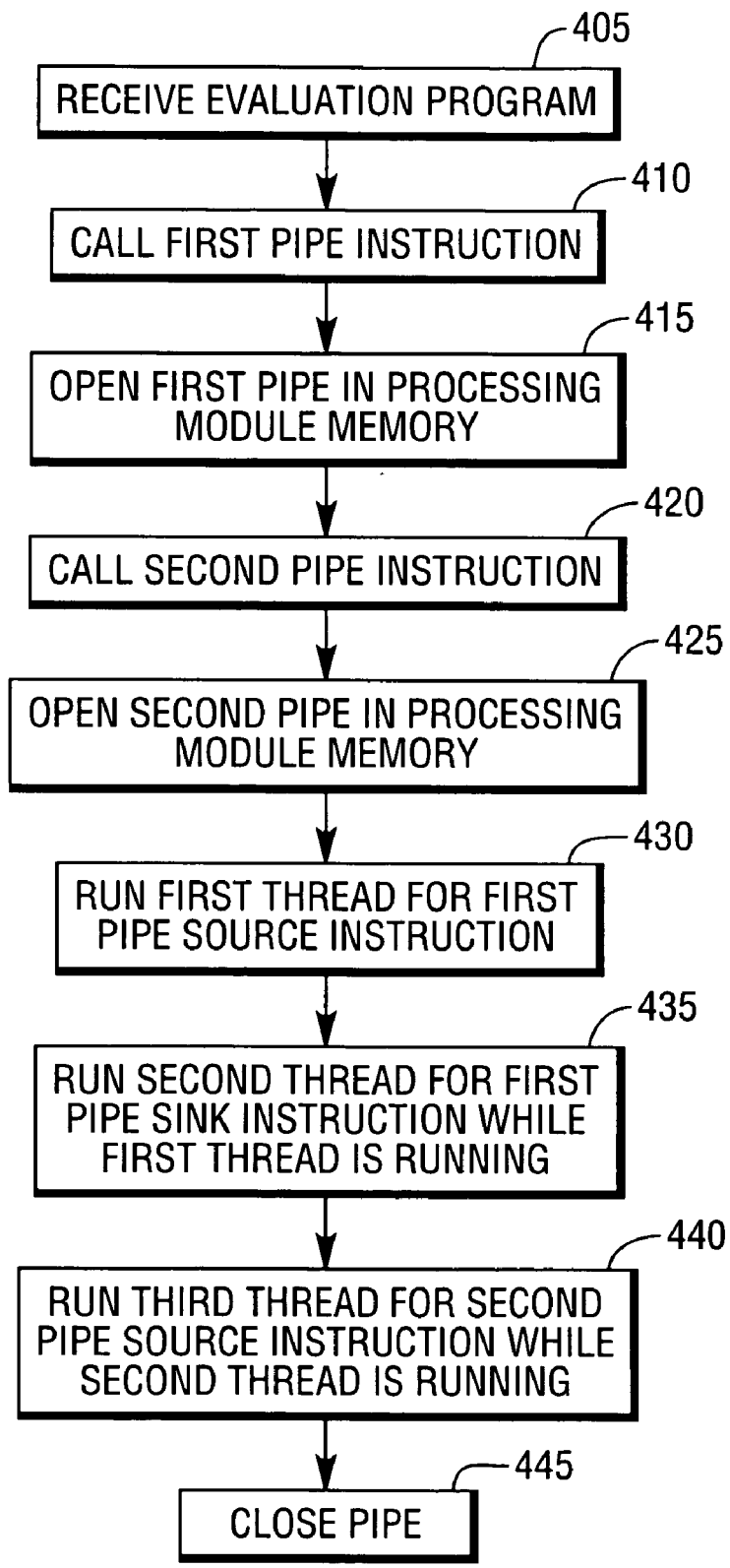
FIG. 4 is a flowchart of executing an evaluation program including a pipeline having two pipe instructions at a processing module.

FIG. 4 is a flowchart of executing an evaluation program including a pipeline having two pipe instructions at a processing module. The processing module receives the evaluation program, block 405. In one implementation, the processing module executes the evaluation program directly or using an interpreter. The processing module recognizes the two pipe instructions and the source and sink instructions for the pipe instructions. The processing module calls the first pipe instruction, block 410. The processing module opens a first memory pipe in the memory of the processing module, block 415. The processing module calls the second pipe instruction, block 420. The processing module opens a second memory pipe in the memory of the processing module, block 425. For example, in one implementation, the processing module allocates a first section of memory for the first pipe and a second section of memory for the second pipe.

The processing module calls the source instruction for the source operation of the first pipe and initiates and runs a first thread for the first pipe source operation, block 430. The processing module initiates the first thread so that the output data of the first thread is directed to the first pipe. The processing module calls the sink instruction for the sink operation of the first pipe and initiates and runs a second thread for the first pipe sink operation, block 435. The processing module initiates the second thread so that the second thread accesses the first pipe to receive input data. The processing module runs the second thread while the first thread is still running. The first pipe sink operation is also the source operation for the second pipe. Accordingly, the processing module also initiates the second thread so that the output data of the second thread is directed to the second pipe. The processing module calls the sink instruction for the sink operation of the second pipe and initiates and runs a third thread for the second pipe sink operation, block 440. The processing module initiates the third thread so that the third thread accesses the second pipe to receive input data. The processing module runs the third thread while the second thread is still running. In one implementation, the processing module runs the third thread while both the first and second threads are still running.

Accordingly, the second thread receives data from the first memory pipe while the first thread continues to output data to the first memory pipe. Similarly, the third thread receives data from the second memory pipe while the second thread continues to output data to the second memory pipe. The processing module does not wait to begin the sink operations until the corresponding source operations have completed processing. Therefore, the processing module uses the pipeline to execute the three operations in parallel. The pipes allows the threads to synchronize, passing data from one thread to the next (after processing the data) without returning the data to storage (e.g., similar to passing buckets in a "bucket brigade"). After all the source and sink operations have completed processing, the processing module closes the pipes, block 445. In one implementation, the processing module closes the first pipe when both the first and second threads have completed processing.

An example of one implementation processing the example expression introduced above follows. Recall the expression:

sel * from table1 where (table1.document | cmd.grep("bad guy stuff") | cmd.wc("−1")< >"0");

As discussed above, the pipe operators create a pipeline so that the output data of "table1.document" is the input data for "cmd.grep("bad guy stuff")" and the output data of "cmd.grep("bad guy stuff")" is the input data of "cmd.wc ("−1")". In this example, table1 is a table created with two fields: an integer field "id", and a CLOB (character large object) field "document". In addition, "cmd" is a UDT having UDM's for text processing commands, including "grep" and "wc", as well as possibly others similar to UNIX text processing commands (e.g., "egrep", "sort", etc.).

Figure 5:
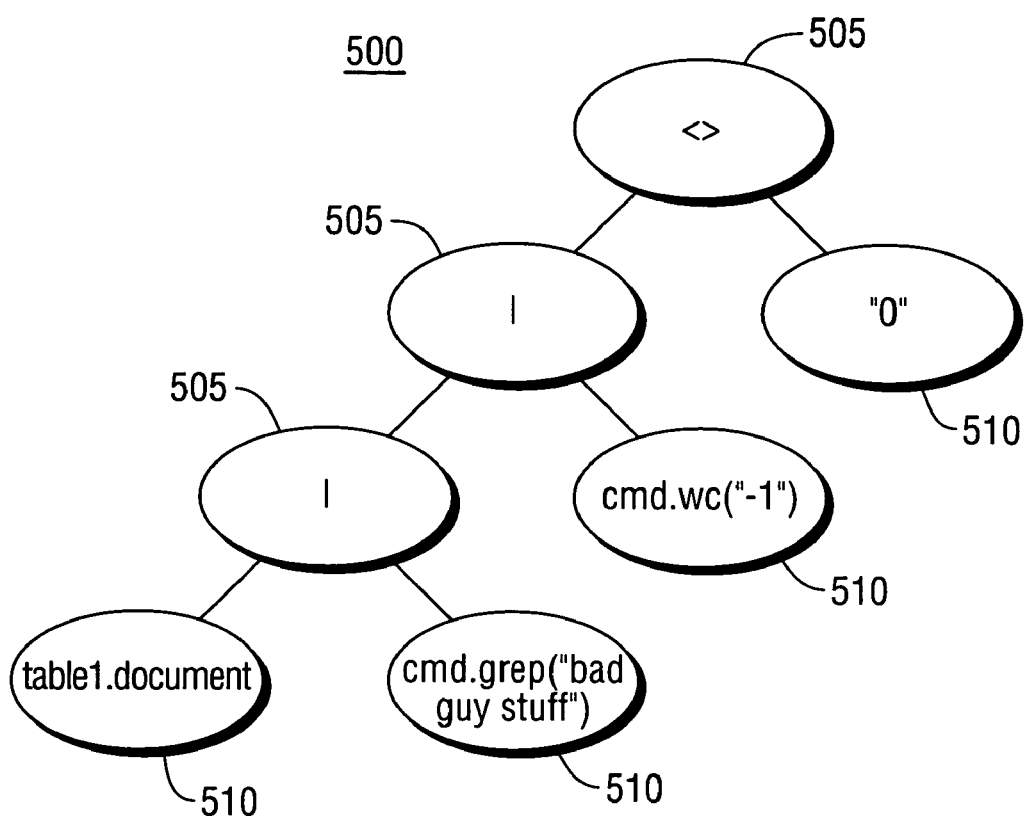
FIG. 5 is a representation of an expression tree.

The database system (e.g., DBMS 100 in FIG. 1) receives the expression and parses the expression (e.g., using parsing engine 120 in FIG. 1). The database system builds an expression tree from the expression, recognizing the pipe operator "|" as an operator in the expression (as the not equals operator "< >" is recognized as an operator). FIG. 5 is a representation of an expression tree 500 built from part of the above expression. Expression tree 500 is a binary tree having internal nodes 505 and leaf nodes 510. Internal nodes 505 represent operators (e.g., a pipe operator). Leaf nodes 510 represent commands or data (e.g., "table1.document"). In one implementation, the processing module parses the expression and builds the expression tree in the same way as a typical processing module, but also recognizes the pipe operator(s) in the expression and so builds the expression tree to include the pipe(s).

The parsing engine traverses the expression tree to build an evaluation program. The parsing engine builds the evaluation program by traversing the expression tree. Referring to FIG. 5, the parsing engine parses expression tree 500 using in-order traversal. FIG. 6 is a representation of an evaluation program as a table 600 based on expression tree 500 in FIG. 5. Table 600 has an operation column 605 and a source column 610. An entry in operation column 605 indicates an instruction to perform an operation or command (e.g., for an operator or a UDM). An entry in source column 610 indicates the source of data for the corresponding entry in operation column 605. The order of entries reflects the order the operations are to be executed by the processing module. For example, the "locvarudt" instruction reads input data from the data object from the table table1 indicated by "table1.document". The "appendvarudt" instruction reads the data into the first pipe in memory and the UDM call for "grep" reads data from the first pipe (indicated by "PIPE" in the source column entry corresponding to "grep"). In one implementation, however, the processing module creates pipes before calling the source and sink instructions and closes the pipes after the source and sink operations have completed processing. Accordingly, the pipe entry in operation column 605 reflects the relationship among the pipe and its source and sink operations rather than necessarily the order of the instruction calls. Accordingly, the evaluation program indicates which instructions to call to perform operations to execute at the processing module and what an instruction should use as input and output. In one implementation, the processing module executes the evaluation program in the same way as a typical processing module, but also recognizes the pipe and so opens a memory pipe and starts multiple threads to provide the pipe functionality, as described above referring to FIGS. 2–4.

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules $105_1 \ldots _N$, data storage facilities $110_1 \ldots _N$, and parsing engine 120. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

What is claimed is:

1. A method of parallel execution in a database system, comprising:
   receiving an expression including a pipe operator in a database system, where the pipe operator has a pipe source operation and a pipe sink operation;
   opening a memory pipe in a memory of a processing module in the database system;
   running a first thread to execute the pipe source operation in the processing module, where the first thread provides output data to the memory pipe;
   running a second thread to execute the pipe sink operation in the processing module while the first thread is running, where the pipe sink operation receives input data from the memory pipe; and
   closing the memory pipe.

2. The method of claim 1, further comprising parsing the expression in the database system including recognizing the pipe operator.

3. The method of claim 2, further comprising:
   building an evaluation program from the parsed expression; and
   sending the evaluation program to one or more processing modules in the database system.

4. The method of claim 3, where building the evaluation program from the parsed expression includes:
   building an expression tree including a pipe node corresponding to the pipe operator, where a first child of the pipe node is a pipe source node corresponding to the pipe source operation and a second child of the pipe node is a pipe sink node corresponding to the pipe sink operation; and
   building the evaluation program including a pipe instruction, where the pipe instruction has a pipe source instruction corresponding to the pipe source operation and a pipe sink instruction corresponding to the pipe sink operation.

5. The method of claim 1, further comprising:
   parsing the expression in the database system including recognizing the pipe operator;
   building an expression tree including a pipe node corresponding to the pipe operator, where a first child of the pipe node is a pipe source node corresponding to the pipe source operation and a second child of the pipe node is a pipe sink node corresponding to the pipe sink operation; and
   building the evaluation program including a pipe instruction, where the pipe instruction has a pipe source instruction corresponding to the pipe source operation and a pipe sink instruction corresponding to the pipe sink operation;
   passing the evaluation program to a processing module;
   calling the pipe instruction at the processing module;
   opening a memory pipe in a memory of the processing module;
   calling the pipe source instruction;
   running a first thread to execute the pipe source instruction, where the first thread provides output data to the memory pipe;
   calling the pipe sink instruction;
   running a second thread to execute the pipe sink instruction while the first thread is running, where the pipe sink instruction receives input data from the memory pipe; and
   closing the memory pipe.

6. The method of claim 1, where the expression also includes a second pipe operator having a second pipe source operation and a second pipe sink operation, and the pipe sink operation is the second pipe source operation, and further comprising:
   opening a second memory pipe in the memory of the processing module in the database system, where the second thread provides output data to the second memory pipe;
   running a third thread to execute the second pipe sink operation in the processing module while the second thread is running, where the second pipe sink operation receives input data from the second memory pipe; and
   closing the second memory pipe.

7. The method of claim 6, where the third thread is running while the first thread is running.

8. A computer program, stored on a tangible storage medium, for use in parallel execution in a database system, the program comprising executable instructions that cause a computer to:
   receive an expression including a pipe operator in a database system, where the pipe operator has a pipe source operation and a pipe sink operation;
   open a memory pipe in a memory of a processing module in the database system;
   run a first thread to execute the pipe source operation in the processing module, where the first thread provides output data to the memory pipe;
   run a second thread to execute the pipe sink operation in the processing module while the first thread is running, where the pipe sink operation receives input data from the memory pipe; and
   close the memory pipe.

9. The computer program of claim 8, further comprising executable instructions that cause a computer to parse the expression in the database system including recognizing the pipe operator.

10. The computer program of claim 9, further comprising executable instructions that cause a computer to:
    build an evaluation program from the parsed expression; and
    send the evaluation program to one or more processing modules in the database system.

11. The computer program of claim 10, where building the evaluation program from the parsed expression includes:
    building an expression tree including a pipe node corresponding to the pipe operator, where a first child of the pipe node is a pipe source node corresponding to the pipe source operation and a second child of the pipe node is a pipe sink node corresponding to the pipe sink operation; and building the evaluation program including a pipe instruction, where the pipe instruction has a pipe source instruction corresponding to the pipe source operation and a pipe sink instruction corresponding to the pipe sink operation.

12. The computer program of claim 8, further comprising executable instructions that cause a computer to:
parse the expression in the database system including recognizing the pipe operator;
build an expression tree including a pipe node corresponding to the pipe operator, where a first child of the pipe node is a pipe source node corresponding to the pipe source operation and a second child of the pipe node is a pipe sink node corresponding to the pipe sink operation; and
build the evaluation program including a pipe instruction, where the pipe instruction has a pipe source instruction corresponding to the pipe source operation and a pipe sink instruction corresponding to the pipe sink operation;
pass the evaluation program to a processing module;
call the pipe instruction at the processing module;
open a memory pipe in a memory of the processing module;
call the pipe source instruction;
run a first thread to execute the pipe source instruction, where the first thread provides output data to the memory pipe;
call the pipe sink instruction;
run a second thread to execute the pipe sink instruction while the first thread is running, where the pipe sink instruction receives input data from the memory pipe; and
close the memory pipe.

13. The computer program of claim 8, where the expression also includes a second pipe operator having a second pipe source operation and a second pipe sink operation, and the pipe sink operation is the second pipe source operation, and further comprising executable instructions that cause a computer to:
open a second memory pipe in the memory of the processing module in the database system, where the second thread provides output data to the second memory pipe;
run a third thread to execute the second pipe sink operation in the processing module while the second thread is running, where the second pipe sink operation receives input data from the second memory pipe; and
close the second memory pipe.

14. The computer program of claim 13, further comprising executable instructions to cause a computer run the third thread while the first thread is running.

15. A parallel execution of a database management system having a computer, comprising:
one or more data storage facilities for use in storing data composing records in tables of a database;
one or more processing modules configured to manage the data stored in the data-storage facilities, where at least one processing module is configured to:
open a memory pipe for a pipe operator,
run a first thread to execute a pipe source operation providing output data to the memory pipe, and
run a second thread to execute a pipe sink operation receiving input data from the memory pipe while the first thread is running; and
a database management component configured to parse an expression and recognize the pipe operator and the pipe source operation for the pipe operator and the pipe sink operation for the pipe operator.

16. The database system of claim 15, where the database management component is further configured to:
build an evaluation program from the parsed expression; and
send the evaluation program to one or more processing modules in the database system.

17. The database system of claim 16, where building the evaluation program from the parsed expression includes:
building an expression tree including a pipe node corresponding to the pipe operator, where a first child of the pipe node is a pipe source node corresponding to the pipe source operation and a second child of the pipe node is a pipe sink node corresponding to the pipe sink operation; and
building the evaluation program including a pipe instruction, where the pipe instruction has a pipe source instruction corresponding to the pipe source operation and a pipe sink instruction corresponding to the pipe sink operation.

18. The database system of claim 17, where at least one processing module receiving the evaluation program is configured to:
call the pipe instruction;
open the memory pipe in a memory of the processing module in response to the pipe instruction;
call the pipe source instruction;
run the first thread to execute the pipe source instruction, where the first thread provides output data to the memory pipe;
call the pipe sink instruction;
run the second thread to execute the pipe sink instruction while the first thread is running, where the pipe sink instruction receives input data from the memory pipe; and
close the memory pipe.

19. The database system of claim 15, where the expression also includes a second pipe operator having a second pipe source operation and a second pipe sink operation, and the pipe sink operation is the second pipe source operation, and where at least one processing module that is configured to open a memory pipe is further configured to:
open a second memory pipe, where the second thread provides output data to the second memory pipe;
run a third thread to execute the second pipe sink operation while the second thread is running, where the second pipe sink operation receives input data from the second memory pipe; and
close the second memory pipe.

20. The database system of claim 19, where at least one processing module is configured to run the third thread while the first thread is running.

* * * * *